(12) United States Patent
Maischberger et al.

(10) Patent No.: US 12,055,411 B2
(45) Date of Patent: Aug. 6, 2024

(54) METHOD AND APPARATUS FOR PROVIDING A PATH-BASED MAP MATCHER

(71) Applicant: HERE Global B.V., Eindhoven (NL)

(72) Inventors: Mirko Maischberger, Berlin (DE); Volodymyr Lisovets, Berlin (DE)

(73) Assignee: HERE Global B.V., Eindhoven (NL)

( * ) Notice: Subject to any disclaimer, the term of this patent is extended or adjusted under 35 U.S.C. 154(b) by 158 days.

(21) Appl. No.: 17/856,261

(22) Filed: Jul. 1, 2022

(65) Prior Publication Data

US 2024/0003705 A1    Jan. 4, 2024

(51) Int. Cl.
*G01C 21/00*  (2006.01)

(52) U.S. Cl.
CPC ..... *G01C 21/3815* (2020.08); *G01C 21/3841* (2020.08)

(58) Field of Classification Search
CPC . G01C 21/3815; G01C 21/3841; G01C 21/30
See application file for complete search history.

(56) References Cited

U.S. PATENT DOCUMENTS

| | | | |
|---|---|---|---|
| 10,060,751 B1* | 8/2018 | Chen | G01C 21/3811 |
| 10,533,862 B1 | 1/2020 | Paranjpe et al. | |
| 10,684,372 B2* | 6/2020 | Jensen | G01S 17/06 |
| 2010/0217517 A1* | 8/2010 | Oohashi | G01C 21/30 701/533 |
| 2012/0288206 A1* | 11/2012 | Yoshimi | G06T 7/74 382/195 |
| 2013/0311086 A1* | 11/2013 | Aoki | G01C 21/3844 701/446 |

(Continued)

FOREIGN PATENT DOCUMENTS

| | | |
|---|---|---|
| CN | 106556402 A1 | 4/2017 |
| CN | 111694032 A | 9/2020 |
| CN | 109459045 B | 10/2020 |

OTHER PUBLICATIONS

Imamichi et al., "Truncating shortest path search for efficient map-matching", Conference paper, Proceedings of the Twenty-Fifth International Joint Conference on Artificial Intelligence (IJCAI-16), Jul. 9, 2016, pp. 589-595.

(Continued)

*Primary Examiner* — Keith D Bloomquist
(74) *Attorney, Agent, or Firm* — DITTHAVONG, STEINER & MLOTKOWSKI

(57) ABSTRACT

An approach is provided path-based map matching of a sequence of probe points. The approach involves, for instance, projecting a probe point of the sequence of probe points to a plurality of element projections, wherein each of the plurality of element projections is a candidate projection of the probe point to a respective candidate location on a map-matched road segment. The approach also involves determining an optimal spatial boundary containing the plurality of element projections associated to the probe point. The approach further involves specifying a distance to the optimal spatial boundary from a previous node as a heuristic of a probabilistic map matcher for all of the plurality of element projections. The approach further involves executing the probabilistic map matcher based on the heuristic to determine a map matched path and providing the map matched path as an output.

20 Claims, 12 Drawing Sheets

(56) References Cited

U.S. PATENT DOCUMENTS

| | | | |
|---|---|---|---|
| 2016/0377439 A1* | 12/2016 | Dorum | G01C 21/26 |
| | | | 701/409 |
| 2018/0356235 A1* | 12/2018 | Jang | G01C 21/3881 |
| 2019/0360818 A1* | 11/2019 | Linder | G01C 21/30 |
| 2020/0128721 A1* | 4/2020 | Lewis | A01B 79/02 |
| 2021/0041241 A1 | 2/2021 | Mitra et al. | |
| 2021/0263972 A1* | 8/2021 | Cooper | G06F 16/93 |
| 2022/0018674 A1 | 1/2022 | Xu et al. | |
| 2022/0207993 A1 | 6/2022 | Fowe | |
| 2023/0236038 A1* | 7/2023 | Hayashi | G01S 5/16 |
| | | | 701/300 |

OTHER PUBLICATIONS

Office Action for related European Application No. 23182643.9-1009, dated Nov. 24, 2023, 15 pages.

\* cited by examiner

100

METHOD AND APPARATUS FOR PROVIDING A PATH-BASED MAP MATCHER

BACKGROUND

Map-matchers often are used to process probe points to identify the correct road or path on which a probe device or vehicle is traveling, and/or to determine the device's location on that road or path. However, current map-matchers can often encounter issues of scalability, and/or efficiency, particularly when processing high volumes of probe data collected from less reliable sources (e.g., crowdsourcing probe data) due to the noise or error in the probe data.

SOME EXAMPLE EMBODIMENTS

Therefore, there is a need for a robust and resource efficient path-based map matching system.

According to one embodiment, a method comprises projecting a probe point of the sequence of probe points to a plurality of element projections. Each of the plurality of element projections is a candidate projection of the probe point to a respective candidate location on a map-matched road segment. The method also comprises determining an optimal spatial boundary containing the plurality of element projections associated to the probe point. The method further comprises specifying a distance to an optimal spatial boundary from a previous node as a heuristic of a probabilistic map matcher for all of the plurality of element projections associated to the probe point. The method further comprises executing the probabilistic map matcher based on the heuristic to determine a map matched path. The method further comprises providing the map matched path as an output.

According to another embodiment, an apparatus comprises at least one processor, and at least one memory including computer program code for one or more computer programs, the at least one memory and the computer program code configured to, with the at least one processor, cause, at least in part, the apparatus to project a probe point of the sequence of probe points to a plurality of element projections. Each of the plurality of element projections is a candidate projection of the probe point to a respective candidate location on a map-matched road segment. The apparatus is also caused to determine an optimal spatial boundary containing the plurality of element projections associated to the probe point. The apparatus is further caused to specify a distance to the optimal spatial boundary from a previous node as a heuristic of a probabilistic map matcher for all of the plurality of element projections associated to the probe point. The apparatus is further caused to execute the probabilistic map matcher based on the heuristic to determine a map matched path. The apparatus is further caused to provide the map matched path as an output.

According to another embodiment, a computer-readable storage medium carries one or more sequences of one or more instructions which, when executed by one or more processors, cause, at least in part, an apparatus to project a probe point of the sequence of probe points to a plurality of element projections. Each of the plurality of element projections is a candidate projection of the probe point to a respective candidate location on a map-matched road segment. The apparatus is also caused to determine an optimal spatial boundary containing the plurality of element projections associated to the probe point. The apparatus is further caused to specify a distance to the optimal spatial boundary from a previous node as a heuristic of a probabilistic map matcher for all of the plurality of element projections associated to the probe point. The apparatus is further caused to execute the probabilistic map matcher based on the heuristic to determine a map matched path. The apparatus is further caused to provide the map matched path as an output.

According to another embodiment, an apparatus comprises means for projecting a probe point of the sequence of probe points to a plurality of element projections. Each of the plurality of element projections is a candidate projection of the probe point to a respective candidate location on a map-matched road segment. The apparatus also comprises means for determining an optimal spatial boundary containing the plurality of element projections associated to the probe point. The apparatus further comprises means for specifying a distance to the optimal spatial boundary from a previous node as a heuristic of a probabilistic map matcher for all of the plurality of element projections associated to the probe point. The apparatus further comprises means for executing the probabilistic map matcher based on the heuristic to determine a map matched path. The apparatus further comprises means for providing the map matched path as an output.

In addition, for various example embodiments described herein, the following is applicable: a computer program product may be provided. For example, a computer program product comprising instructions which, when the program is executed by a computer, cause the computer to perform any one or any combination of methods (or processes) disclosed.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a path-based map matcher are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such can also "one embodiment" is used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Figure 1:
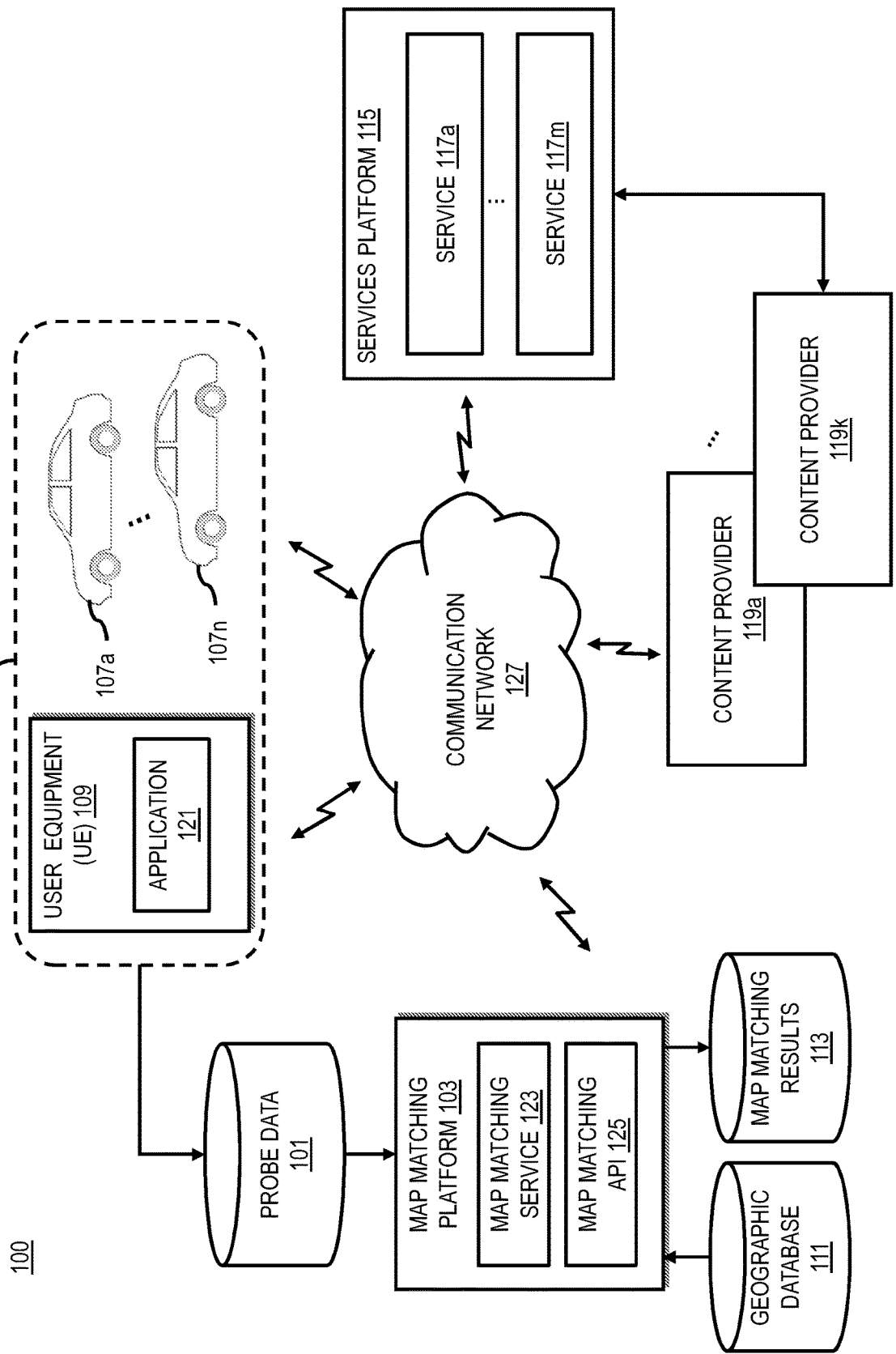
FIG. 1 is a diagram of a system capable of providing a path-based map matcher, according to one embodiment.

FIG. 1 is a diagram of a system capable of providing a path-based map matcher, according to one embodiment. Probe data 101 (e.g., time-stamped location coordinates determined by Global Positioning System (GPS) and/or any other equivalent positioning technology) is used as a widely available resource in the map making industry for a variety of mapping and/or navigation functions such as, but not limited to, identifying map attributes such as new geometry and change of link direction of travel (DoT), speed limit, and/or the like. For example, as part of a raw probe data processing pipeline, map matchers (e.g., a map matching platform 103) are used to identify the road segment/link on which probe devices 105 (e.g., probe vehicles 107a-107n, probe user equipment (UE) device 109, etc.) are travelling and to determine the device/vehicle location on that road segment. Significant progress has been made in the area of map matching technologies and algorithms over the past decade, and these map matching technologies are widely used for many large-scale location-based applications and traffic management services, such as vehicle navigation, traffic and incident reporting, etc. Although the various embodiments described herein as discussed with respect to map matching probe data 101, it is contemplated that the embodiments are also applicable to any other sequence of coordinates in general (e.g., a sequence of coordinates representing a geometry of road segments for a map-to-map conflation).

Generally, there are two types of map matchers: (1) point-based map matchers, and (2) path-based map matchers. For example, a point-based map matcher takes an individual GPS or probe point to match to the road segment or link based on, for instance, a maximum likelihood. On the other hand, a path-based map matcher can produce more accurate results by taking more information in the form of a sequence of GPS or probe points (e.g., instead of a single probe point) and using more a complicated approach (e.g., a probabilistic approach) to map match a probe trajectory to a road segment.

Despite these developments, map matching still presents significant technical problems and challenges for the map making industry. Conventional path-based map matchers, for instance, still suffer from technical challenges arising from issues such as, but not limited to, probe trajectories (e.g., a time-sequence set of probe data points associated with a given probe device) with large location error and/or sparsity that are difficult to map match accurately. In this case, map matching solutions aim to find a correspondence between a sequence of probe point locations (e.g., probe trajectories) and a path location along a sequence of road segments on a map (e.g., the digital map data of a geographic database 111). Different conventional approaches to path-based map matching are available, some of a geometric nature (e.g., finding a proximate road shape that corresponds to a set of points in a probe trace), others of a probabilistic nature (e.g., finding the most probable location on a road based on knowledge about the road network characteristics).

For example, under a probabilistic approach, a map matcher may determine multiple candidate map matched locations or road segments (also referred to herein as targets or states) for a given probe point in a probe sequence or trajectory. For path-based map matchers, the probability of a candidate location or road segment is at least partly based on the distance from a starting point or previously map matched point on the path to the candidate location or road segment. However, for each probe point there can be multiple candidates or targets. Calculating multiple distances (e.g., shortest paths) from a first probe point location to each of the map matching candidate road segments is a computationally expensive procedure. This problem is referred to as the one-to-many path computation problem. As a result, the map matching platform 103 can be computationally resource constrained when scaling to processing thousands or millions of probe trajectories, thereby presenting significant technical challenges.

To address these technical challenges, the system 100 of FIG. 1 introduces a capability to simplify this one-to-many path search operation for path-based map matching. The various example embodiments described herein provide for speeding up the one-to-many path computation for the use case of path matching, where the multiple destinations (e.g., multiple map matching candidates, targets, or states) are contained in a specific area. The approach of the various embodiments described here constitutes a major improvement in computational performance and resource reduction as it reduces the computation time from computing multiple distances (e.g., computing the distances or paths to each candidate or target individually) to performing the computation only once (e.g., one computation that is applicable to all candidates or targets within a predetermined area).

Previous conventional approaches use graph search algorithms, such as Dijkstra or equivalent, that allow for exploring multiple paths. However, in one embodiment, instead of using the Dijkstra algorithm or similar, the various embodiments described herein uses a modified probabilistic map matching (e.g., a modified A* algorithm) configured to use a consistent heuristic function for estimating distance to multiple candidates or targets to generate map matching results 113 (e.g., map matched paths comprising road segments/links corresponding to an input probe trajectory or sequence). By way of example, the A* algorithm or similar is a goal-oriented algorithm that solves a one-to-one shortest path guided by a consistent heuristic function, thus typically unsuited for one-to-many shortest path problems.

The conventional heuristic function used with A* is to compute the Euclidean distance to the target, and when having multiple targets it needs to be computed so that it is an under-estimation to the distance to all targets, while still respecting the triangular inequality. In the approach of the various embodiments described herein, the system 100 (e.g., via the map matching platform 103 or equivalent) firsts computes the optimal spatial boundary (e.g., a minimal circle) containing all the candidates or targets, and then computes the heuristic as the distance to that boundary or circle (e.g., the distance from the current node to the center of the circle, minus the radius of the circle). It is noted that an optimal spatial boundary is a boundary that encompasses a set of candidates or targets according to any bounding algorithm or rule. Examples of a bounding algorithm include but are not limited to a minimal circle, convex hull, bounding box, and/or the like.

Figure 2:
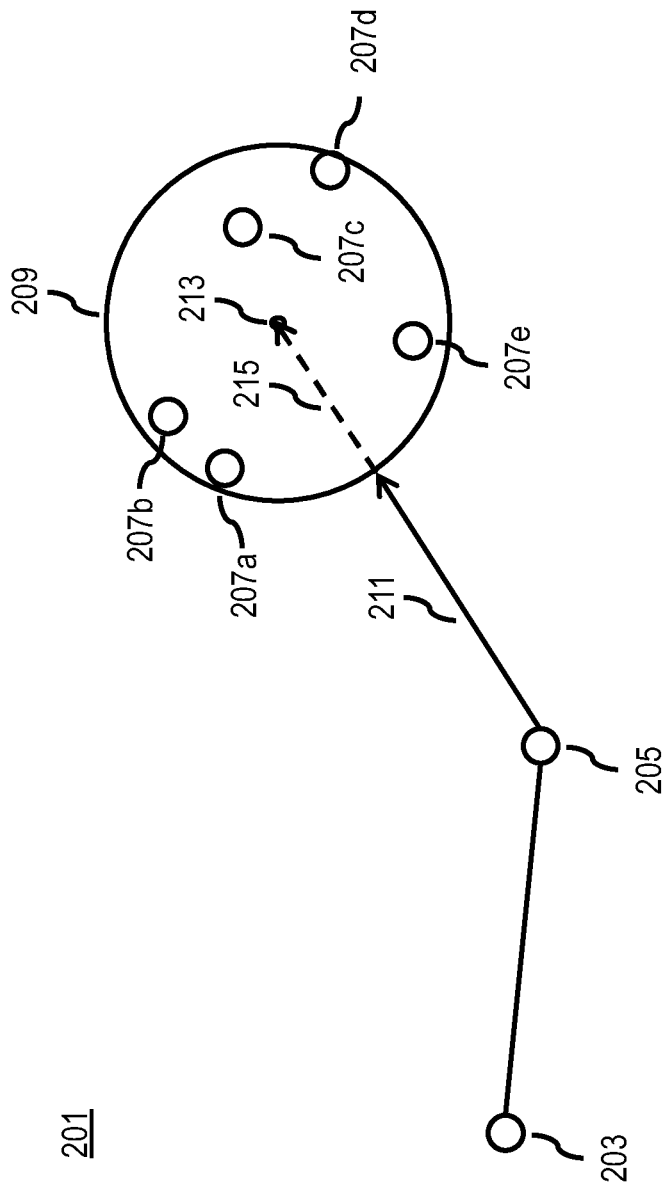
FIG. 2 is a diagram a heuristic function for map matching, according to one embodiment.

FIG. 2 is a diagram a consistent heuristic function for the A* algorithm (or equivalent path search algorithm) applied to probabilistic map matching, according to one embodiment. In order to path match the path using a probabilistic path matcher the shortest path between each element projections of a probe point 203 and all element projections of the next probe point 207a-207e are computed (e.g., computed using the A* algorithm or equivalent). The next probe point in the probe trajectory is projected to element projections 207a-207e which represent candidate map matching locations (e.g., targets or states) for the next probe point. The system 100 first computes a minimal circle 209 that contains all of the element projections 207a-207e. A minimal circle 209, for instance, is a circle with a minimum radius that will still allow it to enclose all of the element projections 207a-207e of the next probe point. Then, to compute the modified or consistent heuristic 211 according to the embodiments described herein, the system 100 determines the distance from the previous node in the path (e.g., intermediate node 205) to the circumference of the minimal circle 209 (or any other type of optimal spatial boundary). In one embodiment, the heuristic 211 can be computed based on the distance to the center 213 of the minimal circle 209 minus the radius 215 of the minimal circle 209. This heuristic is then applied all of the element projections 207a-207e contained within the minimal circle 209. Thus only, one computation is needed to determine the heuristic 211 for all five element projections 207a-207e in the minimal circle 209. In contrast, for a conventional heuristic (e.g., for the A* algorithm or equivalent probabilistic map matcher), the system 100 would have to compute five A* searches from 203 to each one of 207a-207e. Thus, the approach of the various embodiments described herein advantageously results in a decrease in the number of heuristic computations to perform path-based map matching (e.g., by advantageously performing the computation once all targets or candidates instead of individually for each target or candidate).

Figure 3:
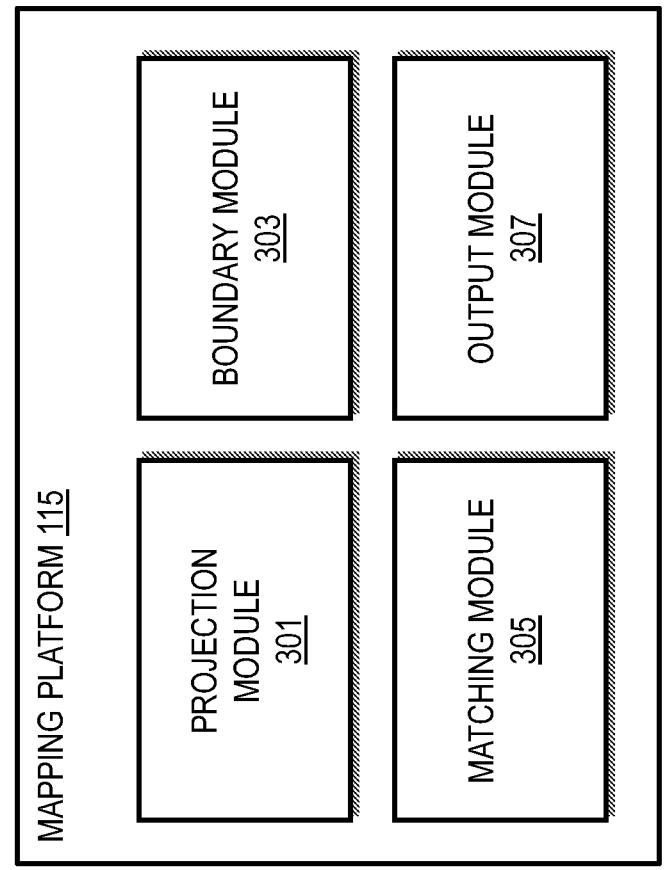
FIG. 3 is a diagram of components of a map matching platform, according to one embodiment.

FIG. 3 is a diagram of components of the map matching platform 103, according to one embodiment. In one embodiment, as shown in FIG. 3, the map matching platform 103 includes one or more components for providing a path-based map matcher using a modified heuristic according to the various embodiments described herein. It is contemplated that the functions of these components may be combined or performed by other components of equivalent functionality. In this embodiment, the map matching platform 103 includes a projection module 301, a boundary module 303, a matching module 305, and an output module 307. The above presented modules and components of the map matching platform 103 can be implemented in hardware, firmware, software, or a combination thereof. Though shown as a separate entity in FIG. 1, it is contemplated that the map matching platform 103 may be implemented as a module of any other component of the system 100 (e.g., a component of the services platform 115, services 117a-117m (also collectively referred to as services 117), vehicle 107, UE 109, application 121 executing on the UE 109, content providers 119a-119k (also collectively referred to as content providers 119), etc.). In another embodiment, one or more of the modules 301-307 may be implemented as a cloud based service, local service, native application, or combination thereof (e.g., a map matching service 123 and/or map matching application programming interface (API) 125 accessible over a communication network 127). The functions of the map matching platform 103 and the modules 301-307 are discussed with respect to figures below.

Figure 4:
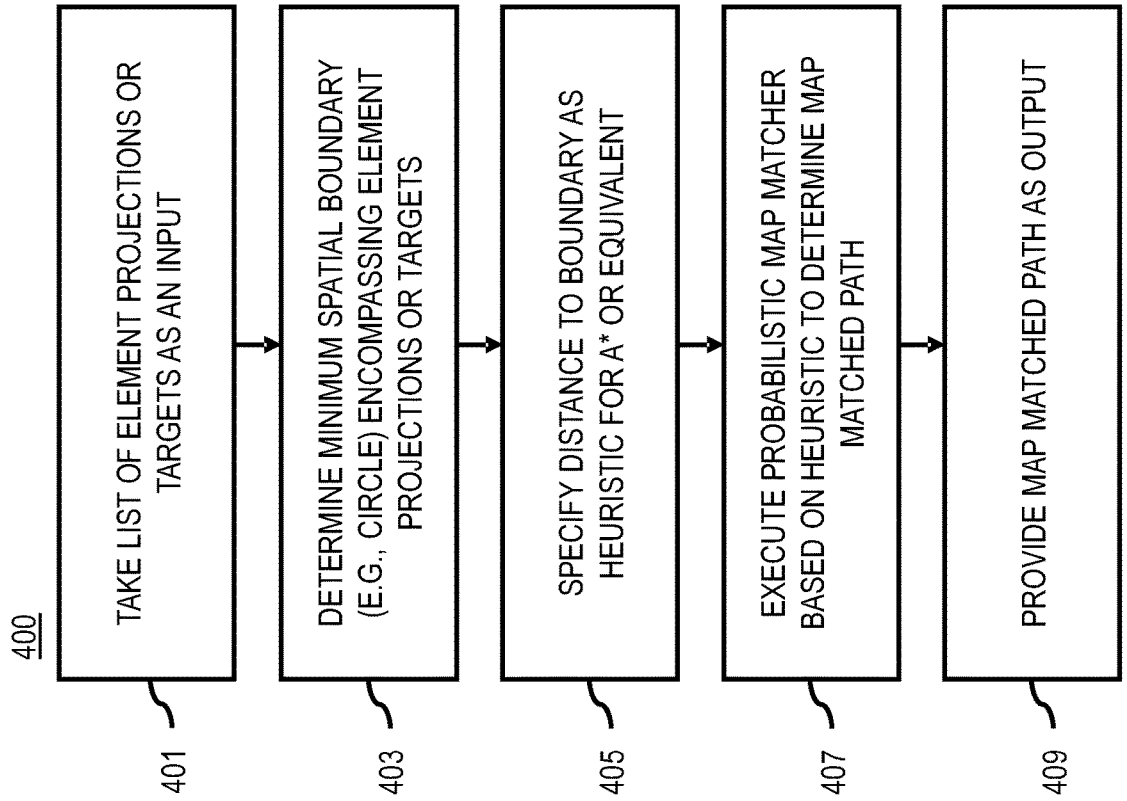
FIG. 4 is a flowchart of a process for path-based map matching using a modified heuristic, according to one embodiment.
Figure 11:
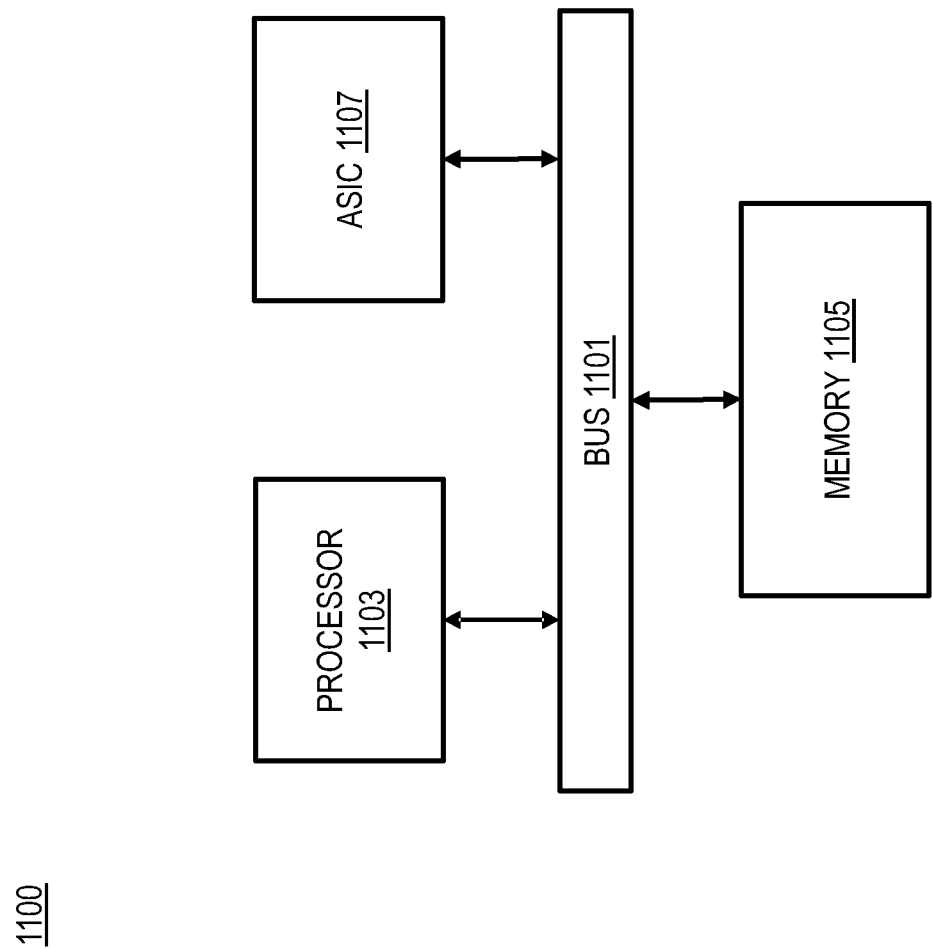
FIG. 11 is a diagram of a chip set that can be used to implement an embodiment.

FIG. 4 is a flowchart of a process 400 for path-based map matching using a modified heuristic, according to one embodiment. In various embodiments, the map matching platform 103 and/or of its modules 301-307 as shown in FIG. 3 may perform one or more portions of the process 400 and may be implemented in, for instance, a chip set including a processor and a memory as shown in FIG. 11. As such, the map matching platform 103 and/or of its modules 301-307 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

In one embodiment, the map matching platform 103 uses a probabilistic path-based map matcher. For example, in such a path-based map matcher, the problem is modelled as a Hidden Markov Model (HMM), which allows for estimating a probability of a probe trace continuing on connected road segments. Individual road segments (or candidates, targets, element projections associated with the road segments) are states of the HMM, and probe point locations (or projected candidate locations) are state measurements. The goal is to match the measurement to the state, which translates to an identified road segment for the probe point location. The advantage of using an HMM is that the connectivity and directionality knowledge of the road map affects the probability of a state being match. This means that overly complex, unlikely, or illegal maneuvers are far less probable as outcomes for the map matching.

In the proposed solution, the individual road segments are further segmented to create multiple states for the HMM. This allows for map matching in situations where a single road may have a more complex geometry or very long road segments. By introducing multiple states per road, a more accurate map matching can be performed. However, this has the downside that shortest paths from the probe point location to the multiple states still need to be calculated. This is possible with the Dijkstra algorithm; however, the performance of the Dijkstra algorithm generally is far too computationally slow given current computing hardware for on-demand applications.

In one embodiment, to introduce the multiple states, a proximity search is performed around a probe point of a trajectory that is to be map matched. For example, the proximity search can be performed using a configurable radius (e.g., typically around 40 meters in one implementation or any other designated value). In addition or alternatively, the radius or extent of the proximity could be configured as a multiple of the standard deviation of the reading. In yet another embodiment, the radius or extent of the search (and therefore of the optimal spatial boundary around the resulting targets, element projections, etc.) can be dynamically determined based on the location error of the probe point, topology of the road network, map data features associated with the area, and/or the like. In one embodiment, element projections, targets, and/or states are points on the road network set at predetermined intervals (e.g., every 10 meters or any other designated value) on each road segment that falls within the range of the proximity search. All of these element projections or targets resulting from the proximity search are taken as states for the HMM model.

Figure 5:
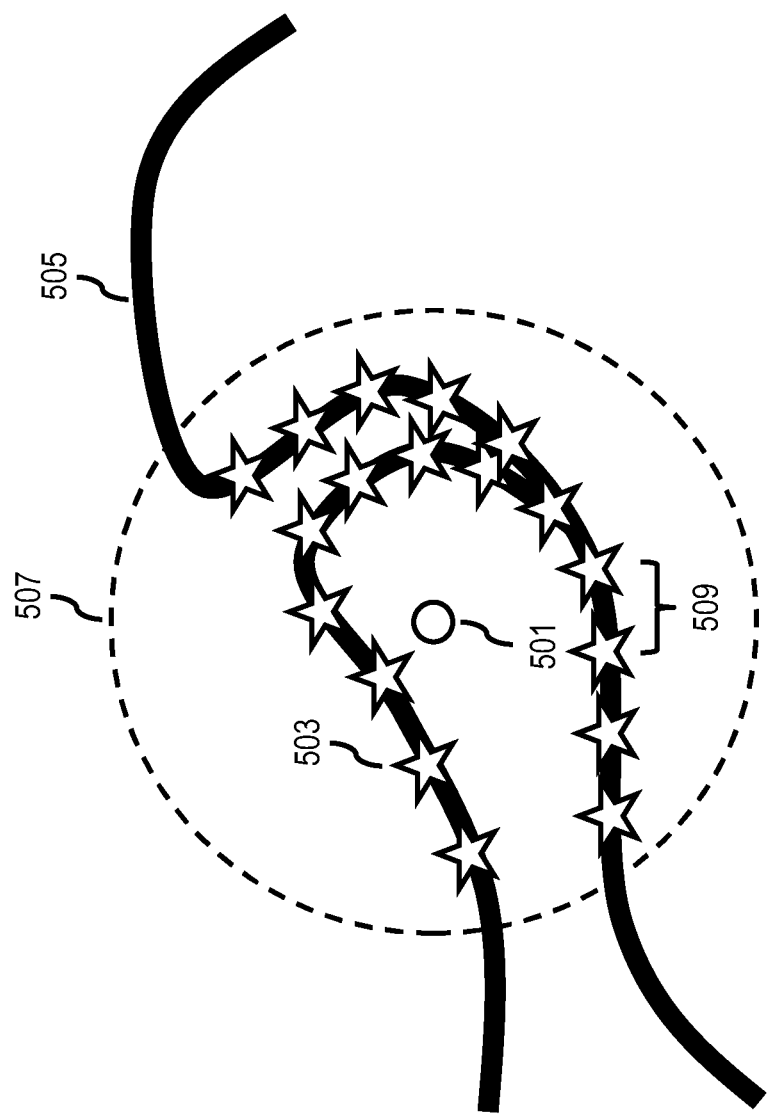
FIG. 5 is a diagram illustrating an example of probe point and element projections, according to one embodiment.

FIG. 5 is a diagram illustrating an example of probe point 501 and element projections 503, according to one embodiment. As shown, a probe point 501 of interest (e.g., represented by a circle symbol) is to be map matched to a road network 505 with complex topology. To capture the complex topology for path-based map matching, the map matching platform 103 generates the a series of element projections 503 (represented by star symbols) based on a proximity search with a configurable radius 507 (40 m in this example). The road segments of the road network 505 falling within the radius 507 are returned. The map matching platform 103 generates element projections 503 at optimal intervals 509 on the road segments that resulted from the proximity search. Each of the element projections 503 represents a possible state (e.g., a candidate map matched location or target) of the probe point 501 for path-based map matching. As used herein the term "optimal interval" refers to any process for determining the spacing between the generated element projections 503. Examples of the process include but is not limited to generating the element projections 503 at regular intervals (e.g., with a predetermined spacing between each element projection 503 such as every x meters) or at irregular intervals (e.g., using building accessor locations as the partition, varying based on topology or probe density, and/or the like).

In one embodiment, to calculate the path from an element projection associated to a probe point location to the multiple element projections of the subsequent probe point, the map matching platform 103 uses the A* algorithm or similar path search algorithm. As discussed above, A* is a goal-driven algorithm, and thus it generally is not suitable for performing the one-to-many path calculation to each element projection.

Accordingly, in one embodiment, the process 400 adapts the A* algorithm or similar algorithm to the one-to-many case by using the modified heuristic to reduce the number of distance computations to be performed for each element projection, target, or state as discussed with respect to the various embodiments described herein. More specifically, various embodiments of the process 400 can be performed as described below with reference to the example of FIG. 6 which is a diagram illustrating an example of path-based map matching of probe points, according to one embodiment.

At step 401, a list of the element projections is taken as an input. In one embodiment, the projection module 301 of the map matching platform 103 projects a probe point of a sequence of probe points (e.g., a probe trajectory that is to be map matched) to a plurality of element projections. Each of the plurality of element projections is a candidate projection of the probe point to a respective candidate location on a map-matched road segment. The element projections can be generated as described in the embodiments above (e.g., projections at regular intervals to road segments within a proximity search). It is noted that this embodiment of element projection is provided by way of illustration and not as a limitation. It is contemplated that any other equivalent process for specifying element projections, candidate map matched locations, targets, etc. can be used according to the various embodiments described herein. One example of an alternate process is to determine the element projections or candidates by taking a predetermined number of the best matching locations generated by a point-based map matcher (e.g., the top x number of map matched candidate locations with the highest matching probability).

Figure 6:
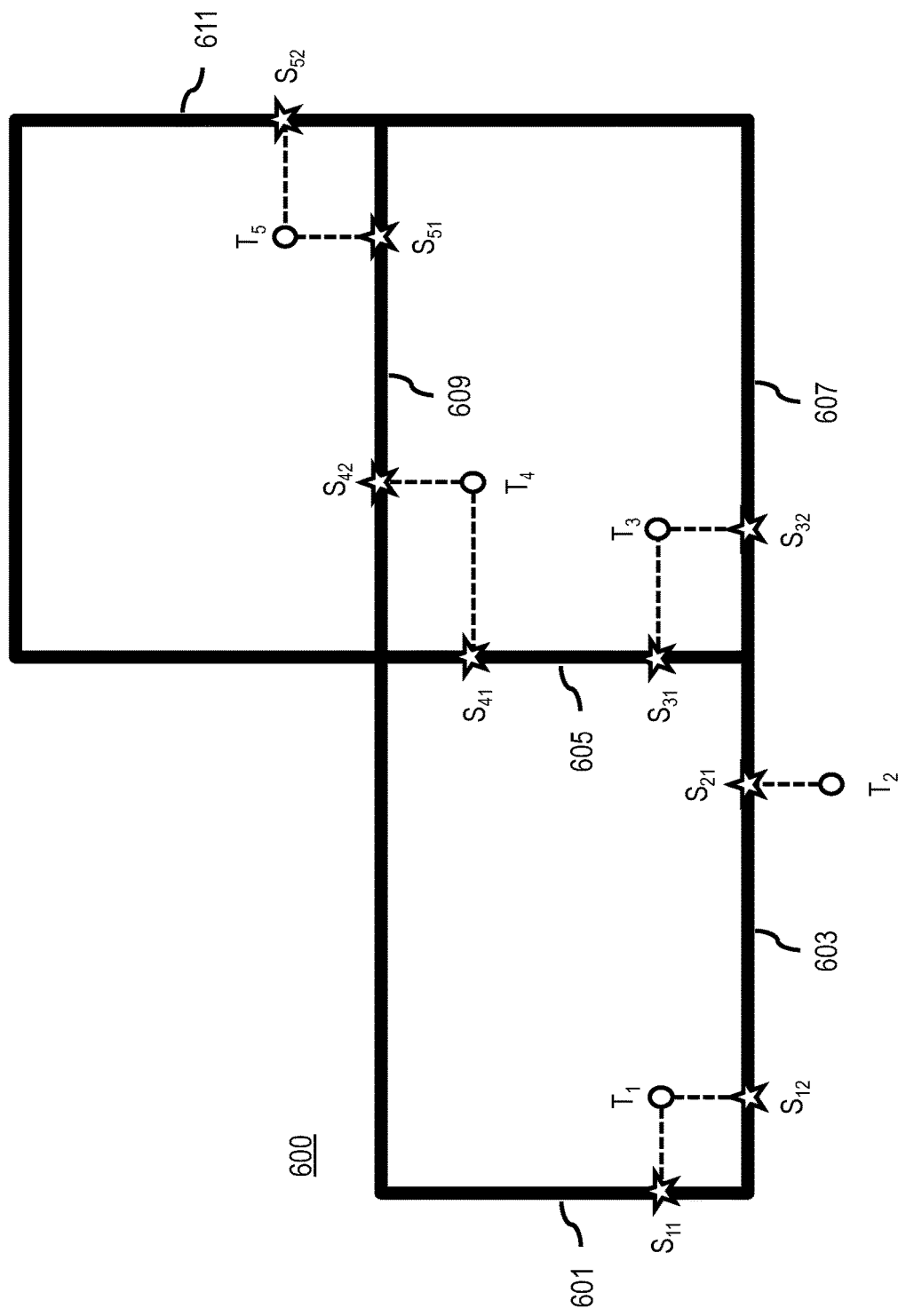
FIG. 6 is a diagram illustrating an example of path-based map matching of probe points, according to one embodiment.

In the example of FIG. 6, a probe trajectory consists of five probe points labeled $T_1$ to $T_5$ based on the chronological order of their capture (e.g., points comprising a time stamp and detected latitude and longitude). As shown, probe point $T_1$ is projected to element $S_{11}$ on road segment 601 of a road network 600 and to element projection $S_{12}$ on road segment 603; probe point $T_2$ is projected to element projection $S_{21}$ on road segment 603; probe point $T_3$ is projected to element projection $S_{31}$ on road segment 605 and to element projection $S_{32}$ on road segment 607; probe point $T_4$ is projected to element projection $S_{41}$ on road segment 605 and to element projection $S_{42}$ on road segment 609; and probe point $T_5$ is projected to element projection $S_{51}$ on road segment 609 and to element projection $S_{52}$ on road segment 611. Each of the element projections represent possible states (e.g., possible map matched candidate locations) of the respective probe points $T_1$-$T_5$. The list of element projections in this example includes: $S_{11}$, $S_{12}$, $S_{21}$, $S_{31}$, $S_{32}$, $S_{41}$, $S_{42}$, $S_{51}$, and $S_{52}$.

At step 403, after obtaining the list of element projections or states, the optimal spatial boundaries (e.g., a minimal circle) encompassing all element projections associated to each probe point is calculated. In other words, the boundary module 303 of the map matching platform 103 determines an optimal spatial boundary containing the plurality of element projections corresponding each probe point in the probe trajectory that is to be map matched. In one embodiment, the optimal spatial boundary or circle has a designated size or radius (e.g., fixed at a value such as 40 m, or dynamically calculated based on location error of the probe points, topology of the road network, and/or map data). Accordingly, the element projections can be clustered according to each corresponding probe point location. In one embodiment, to avoid potentially overlapping of the optimal spatial boundaries or circles, the projection module 301 can determine the density or sparsity of the probe data or trajectory, and then filter the probe trajectory data to increase sparsity (e.g., minimum 100 m or other designated factor greater than the radius of the optimal spatial boundary).

With respect to the example of FIG. 6, the boundary module 303 can enclose the respective element projections of each corresponding probe point with an optimal spatial boundary or circle. For example, element projections $S_{11}$ and $S_{12}$ of probe point $T_1$ can be enclosed within one optimal circle, element projection $S_{21}$ of probe point $T_2$ can be enclosed within another minimal circle, element projections $S_{31}$ and $S_{32}$ of probe point $T_3$ can be enclosed within another minimal circle, element projections $S_{41}$ and $S_{42}$ of probe point $T_4$ can be enclosed within another minimal circle, and element projections $S_{51}$ and $S_{52}$ of probe point $T_5$ can be enclosed within another minimal circle.

At step 405, a consistent heuristic for A* or any equivalent path search algorithm is defined as the distance from an element projection associated with a probe point location in the probe trajectory to the circumference or boundary of the minimal spatial boundary or circle encompassing the element projections or targets associated with a next probe point. The computed distance or heuristic is then used for all targets, element projections, or states encompassed in the corresponding circle so that individual shortest path searches need not be computed. The heuristic, for instance, represents a movement cost used in the A* or equivalent algorithm. In other words, the matching module 305 specifies a distance to the minimal spatial boundary from a previous node as a heuristic of a probabilistic map matcher for all of the plurality of element projections associated with the next probe point in the probe trajectory.

At step 407, using the heuristic, the A* or equivalent algorithm is executed. The execution of the A* or equivalent finds the distance to all the element projections. Because the computed distance or heuristic applies to all element projections within a given optimal spatial boundary or circle, the computation of the distance is only performed once for all element projections in the circle, thereby reducing the number of computations relative to the conventional A* heuristic (e.g., compute Euclidean distance to each element projection or target). The distance is used by the probabilistic path-based map matcher to build the trellis diagram that allows the Viterbi algorithm to select the one path that matches the correct position on the road link with the highest probability. In other words, the matching module 305 executes the probabilistic map matcher based on the heuristic to determine a map matched path.

Figure 7:
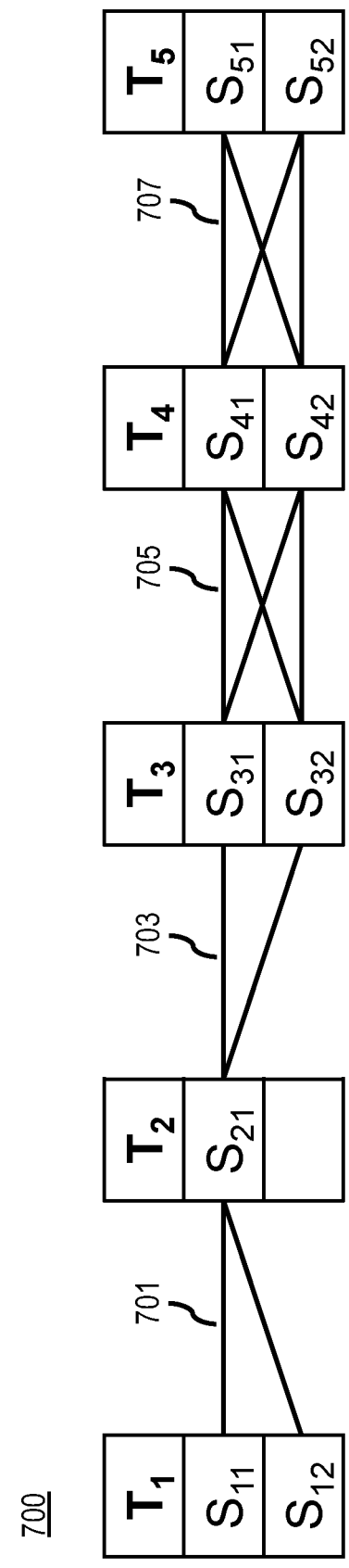
FIG. 7 is a diagram illustrating an example trellis diagram for path-based map matching, according to one embodiment.

FIG. 7 is a diagram illustrating an example trellis diagram 700 for path-based map matching, according to one embodiment. The trellis diagram 700 is based on the example of FIG. 6 and lists probe points $T_1$-$T_5$ of FIG. 6 along with their corresponding element projections or states. For example, probe point $T_1$ has two possible states or element projections $S_{11}$ and $S_{12}$; probe point $T_2$ has one possible state or element projection $S_{21}$; probe point $T_3$ has two possible states or element projections $S_{31}$ and $S_{32}$; probe point $T_4$ has two possible states or element projections $S_{41}$ and $S_{42}$, and probe point $T_5$ has two possible states or element projections $S_{51}$ and $S_{52}$. Each state is associated with probability that the state or element projection is a true state of the corresponding probe point. For example, the trellis diagram 700 will include a probability that probe point $T_1$ is in state $S_{11}$ (e.g., $P(S_{11}|T_1)$) and another probability that probe point $T_1$ is in state $S_{12}$ (e.g., $P(S_{12}|T_1)$), and so on for each probe point and state pair.

The trellis diagram 700 also includes all possible transitions between the states of adjacent probe points. As shown, transitions 701 occur between states $S_{11}$ and $S_{12}$ of probe point $T_1$ to state $S_{21}$ of probe point $T_2$; transitions 703 occur between states $S_{21}$ of probe point $T_2$ and states $S_{31}$ and $S_{32}$ of probe point $T_3$; transitions 705 occur between states $S_{31}$ and $S_{32}$ of probe point $T_3$ and states $S_{41}$ and $S_{42}$ of probe point $T_4$; and transitions 707 occur between states $S_{41}$ and $S_{42}$ of probe point $T_4$ and states $S_{51}$ and $S_{52}$ of probe point $T_5$. As with the possible states of probe point, each transition between the states of two adjacent probe points is also associated with a transition probability. For example, between probe points $T_1$ and $T_2$, there is the transition probability for the path going from state $S_{11}$ to $S_{21}$ (e.g., $P(S_{11} \rightarrow S_{21})$), and another transition probability for the path going from state Sit to $S_{21}$ (e.g., $P(S_{12} \rightarrow S_{21})$), and so on for each combination of states between probe points. The transition probability of each state to state transition is based on the line of sight distance as well as the shortest path distance between each state pair. Because the various embodiments compute heuristic distance for all states or element projections within a minimal circle, each of the distances each state pair of two adjacent probe points are only computed once, resulting in significant reduction in needed computations relative to the conventional heuristic.

The determine the best path through the trellis diagram 700, the matching module 305 can use a Viterbi algorithm or equivalent to the determine the path through the trellis diagram 700 with the highest probability (e.g., high sum or state and transition probabilities). Because each state is associated with a map matched road segment or portion thereof, the high probability path through the states and transitions of the trellis diagram 70 can be converted to a sequence of corresponding road segments indicating the best map matched path given the input probe points and element projections.

At step 409, the output module 307 provides the map matched path generated according to the embodiments above (e.g., map matching results 113) as an output. In one embodiment, the output can include any one or more of: (1) a list of unmatched points; (2) for each matched point, the output can include the topology segment ID (e.g., road link ID) and the fraction/offset along with the matched coordinates; and/or (3) for each pair of matched points, the output includes the sequence of topology segments (e.g., path) to connect the pair with a route. It is contemplated that the output can be used by any component of the system 100 including but not limited to the service platform 115, services 117, content providers 119, vehicles 107, UEs 109, applications 121, etc. for any function that uses path-based map matching outputs. In one embodiment, the output (e.g., stored map matching results 113, residing in-memory on a client device, or non-persisted memory for quick delivery) can be accessed via a map matching service 123, a map matching API 125, or any equivalent interface to the map matching platform 103 or functions thereof. In one embodiment, the output of the map matching platform 103 (e.g., map matching results 113) can be used for any number of applications relying on computationally less intensive map matching. These use cases include but are not limited to: (1) map making; (2) providing better navigation experiences (e.g., especially for cheaper user devices which may have lower quality GPS or other positioning systems and for battery operated devices); (3) providing location intelligence; and (4) improving autonomous driving or highly assisted driving, among other possible use cases.

Figure 8:
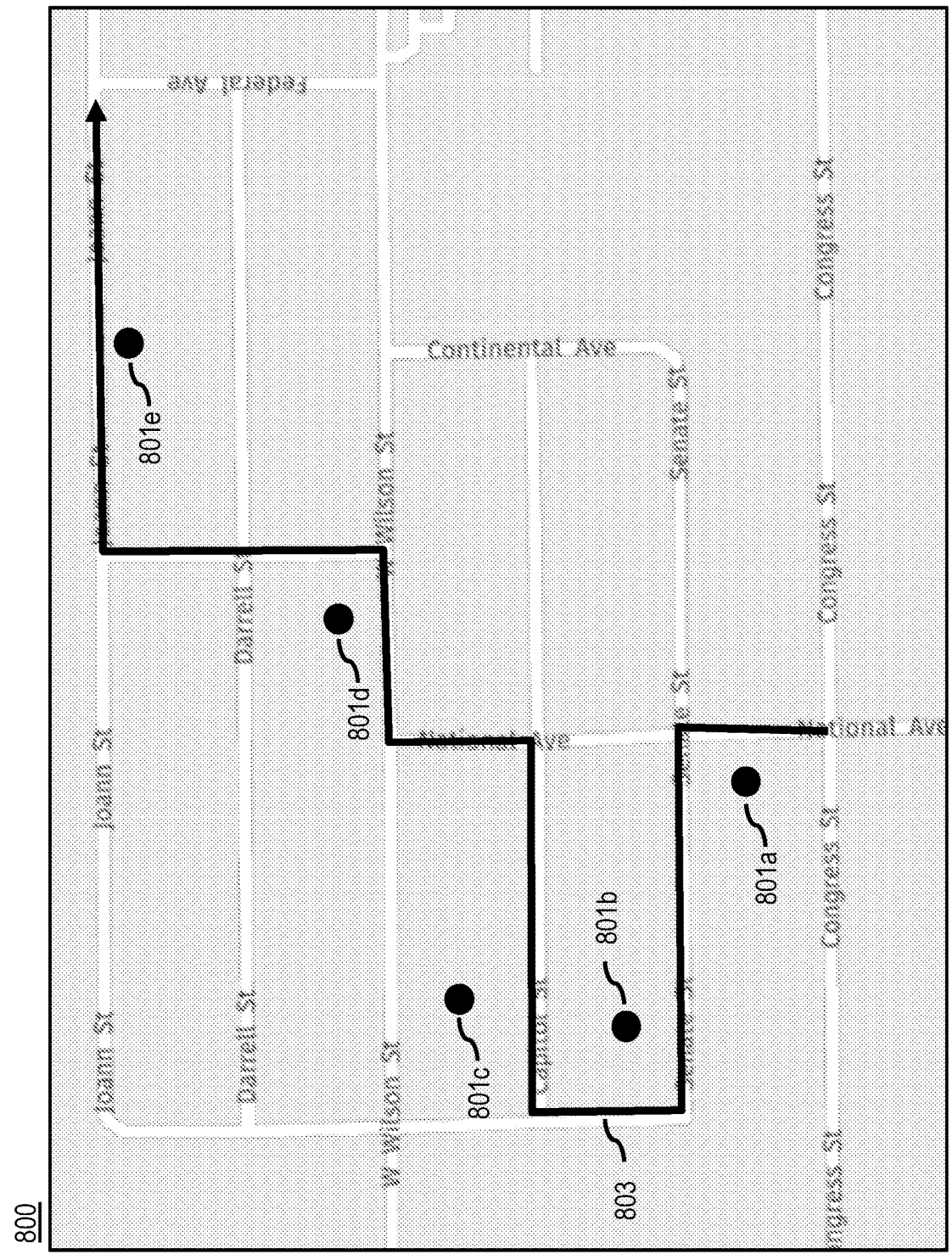
FIG. 8 is a diagram of a mapping user interface generated based on the output of the map matching platform, according to one embodiment.

FIG. 8 is a diagram of a mapping user interface generated based on the output of the map matching platform 103, according to one embodiment. In the example of FIG. 8, a sequence of probe points 801*a*-801*e* is provided as an input to the map matching platform 103. The map matching platform 103 perform path-based map matching based on the modified heuristic according to the various embodiments described herein and outputs a map matched path 803 for the input probe points. The map matched path 803 can then be rendered in the mapping user interface 800.

In one embodiment, the approach of the various embodiments described herein is executable on streaming scenarios, batch scenarios, or on-device.

Returning to FIG. 1, as shown, the system 100 comprises one or more vehicles 107 and/or one or more UEs 109 that act as probes traveling over a road network (e.g., the transportation network 109). Although the vehicles 107 are depicted as automobiles, it is contemplated that the vehicles 107 can be any type of transportation vehicle, manned or unmanned (e.g., planes, aerial drone vehicles, motorcycles, boats, bicycles, etc.), and the UE 109 can be associated with any of the types of vehicles or a person or thing (e.g., a pedestrian) traveling within a transportation or road network. In one embodiment, each vehicle 107 and/or UE 109 is assigned a unique probe identifier (probe ID) for use in reporting or transmitting probe data collected by the vehicles 107 and UE 109. The vehicles 107 and UE 109, for instance, are part of a probe-based system for collecting probe data for monitoring a road network. In one embodiment, each vehicle 107 and/or UE 109 is configured to report probe data as probe points, which are individual data records collected at a point in time that records telemetry data for that point in time. The probe points can be reported from the vehicles 107 and/or UEs 109 in real-time, in batches, continuously, or at any other frequency requested by the system 100 over, for instance, the communication network 127 for processing by the map matching platform 103.

In one embodiment, a probe point can include attributes such as: probe ID, longitude, latitude, speed, and/or time. The list of attributes is provided by way of illustration and not limitation. Accordingly, it is contemplated that any combination of these attributes or other attributes may be recorded as a probe point (e.g., such as those previously discussed above). For example, attributes such as altitude (e.g., for flight capable vehicles or for tracking non-flight vehicles in the altitude domain), tilt, steering angle, wiper activation, etc. can be included and reported for a probe point. In one embodiment, if the probe point data includes altitude information, the transportation network, links, etc. can also be paths through an airspace (e.g., to track aerial drones, planes, other aerial vehicles, etc.), or paths that follow the contours or heights of a road network (e.g., heights of different ramps, bridges, or other overlapping road features).

In one embodiment, the vehicles 107 and/or UE 109 may include sensors for reporting measuring and/or reporting attributes. The attributes can also be any attribute normally collected by an on-board diagnostic (OBD) system of the vehicle, and available through an interface to the OBD system (e.g., OBD II interface or other similar interface).

In one embodiment, the system 100 can build trajectories using probe provider information and/or probe identifier (probe ID) information associated with the probe data. For example, the system 100 builds the trajectories by matching the probe points in the probe data according to probe identifier and sequencing the probe points according to time. In this way, the trajectory can identify the movement path of the respective probe or device within the bounded geographic area over a time range covered by the probe data. Because the trajectories are made of individual probe points, each point in the trajectory also has the properties or attributes recorded for each probe point. For example, at any given point along the trajectory, a heading, speed, position, etc. of the probe point can be determined for a candidate probe point. Then the existing trajectory to which a probe point might be added can be assumed by the system 100 to be equivalent to a link against which the probe point can be matched. Accordingly, attributes to the trajectory can then extracted to create a candidate probe point and link/trajectory pair for classification by the map matching platform 103.

In one embodiment, the map matching platform 103 performs the processes for map matching of the collected probe points according to various embodiments described herein. By way of example, the map matching platform 103 can be a standalone server or a component of another device with connectivity to the communication network 127. For example, the component can be part of an edge computing network where remote computing devices (not shown) are installed along or within proximity of a transportation network to provide map matching of probe data collected locally or within a local area served by the remote or edge computing device.

In one embodiment, the map matching platform 103 has connectivity or access to a geographic database 111 that includes mapping data about a road network (additional description of the geographic database 111 is provided below with respect to FIG. 9). In one embodiment, the probe data, map matching results, and/or related information can also be stored in the map matching results database 113 and/or geographic database 111 by the map matching platform 103. In addition or alternatively, the probe data can be stored by another component of the system 100 in the geographic database 111 for subsequent retrieval and processing by the map matching platform 103.

In one embodiment, the vehicles 107 and/or UE 109 may execute an application 121 to present or use the results of map matching generated by the map matching platform 103 according to the embodiments described herein. For example, if the application 121 is a navigation application, then the map matching results can be used to determine positioning information, routing information, provide updated estimated times of arrival (ETAs), and the like.

By way of example, the UE 109 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 109 can support any type of interface to the user (such as "wearable" circuitry, etc.). In one embodiment, the UE 109 may be associated with a vehicle 107 (e.g., cars), a component part of the vehicle 107, a mobile device (e.g., phone), and/or a combination of thereof. Similarly, the vehicle 107 may include computing components that can perform all or a portion of the functions of the UE 109.

By way of example, the application 121 may be any type of application that is executable at the vehicle 107 and/or the UE 109, such as mapping applications, location-based service applications, navigation applications, content provisioning services, camera/imaging application, media player applications, social networking applications, calendar applications, and the like. In one embodiment, the application 121 may act as a client for the map matching platform 103 and perform one or more functions of the map matching platform 103 alone or in combination with the platform 103.

In one embodiment, the vehicles 107 and/or the UE 109 are configured with various sensors for generating probe data. By way of example, the sensors may include a global positioning sensor for gathering location data (e.g., GPS), Light Detection And Ranging (LIDAR) for gathering distance data and/or generating depth maps, infrared sensors for thermal imagery, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstruction for analysis and documentation purposes), an audio recorder for gathering audio data, velocity sensors mounted on steering wheels of the vehicles, switch sensors for determining whether one or more vehicle switches are engaged, and the like.

In another embodiment, the sensors of the vehicles 107 and/or UE 109 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors may detect weather data, traffic information, or a combination thereof. In one example embodiment, the vehicles 107 and/or UE 109 may include GPS receivers to obtain geographic coordinates from satellites for determining current location and time associated with the vehicle 107 and/or UE 109 for generating probe data. Further, the location can be determined by a triangulation system such as A-GPS, Cell of Origin, or other location extrapolation technologies.

The communication network 127 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The services platform 115 may include any type of service 117. By way of example, the services 117 may include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services platform 115 may interact with the map matching platform 103, the vehicle 107, the UE 109, and/or one or more content providers 119 to provide the services 117.

In one embodiment, the content providers 119 may provide content or data to the vehicles 107 and/or UEs 109, the map matching platform 103, and/or the services 117. The content provided may be any type of content, such as mapping content, textual content, audio content, video content, image content, etc. In one embodiment, the content providers 119 may provide content that may aid in the various embodiment of path-based map matching described herein. In one embodiment, the content providers 119 may also store content associated with the vehicles 107, the UE 109, the map matching platform 103, and/or the services 117. In another embodiment, the content providers 119 may manage access to a central repository of data, and offer a consistent, standard interface to data, such as a repository of probe data, probe features/attributes, link features/attributes, etc. Any known or still developing methods, techniques or processes for retrieving and/or accessing feature values for probe points and/or road links from one or more sources may be employed by the map matching platform 103.

By way of example, the vehicles 107, the UEs 109, the map matching platform 103, the services platform 115, and/or the content providers 119 communicate with each other and other components of the system 100 using well known, new or still developing protocols. In this context, a protocol includes a set of rules defining how the network nodes within the communication network 127 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
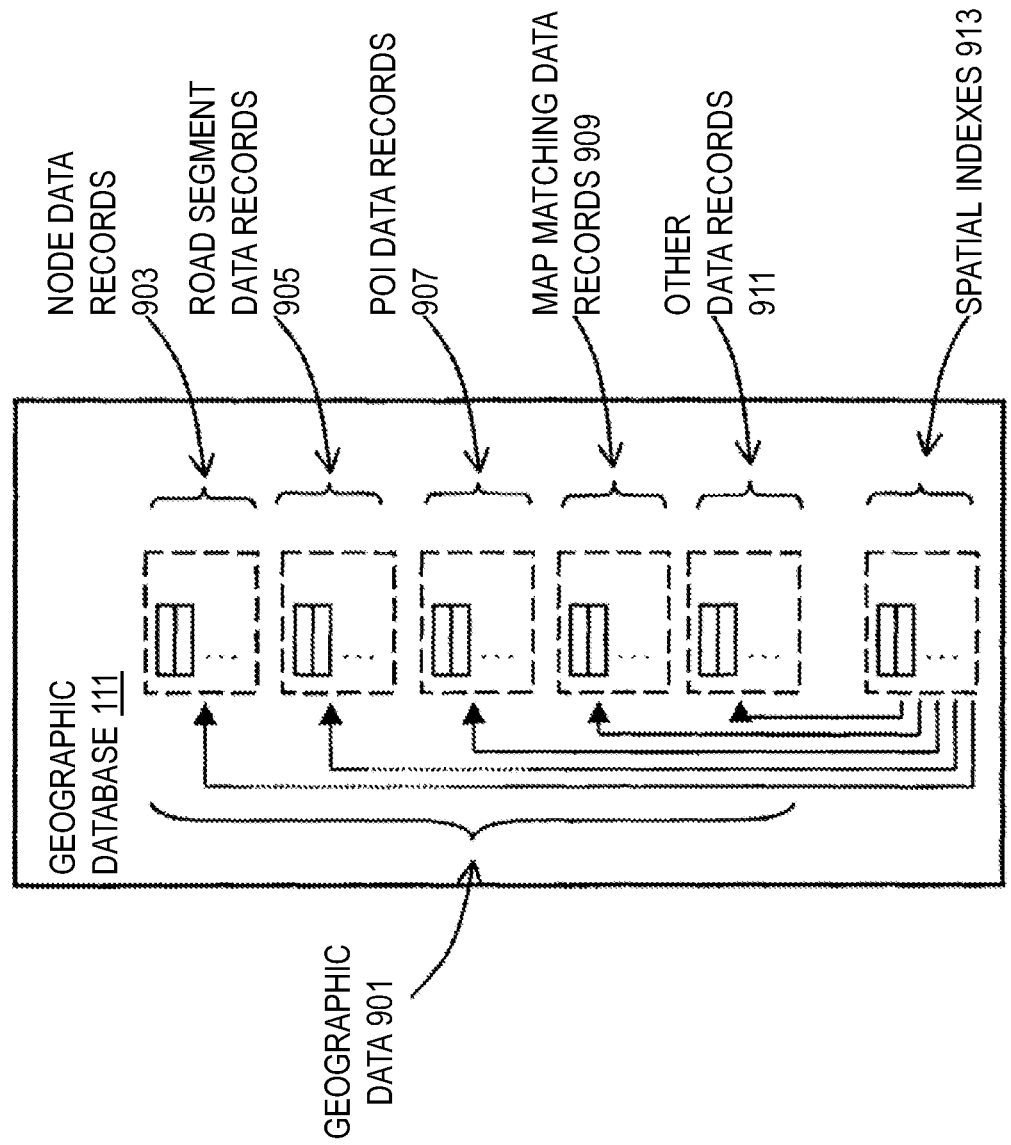
FIG. 9 is a diagram of a geographic database, according to one embodiment.

FIG. 9 is a diagram of a geographic database 111, according to one embodiment. In one embodiment, the geographic database 111 includes geographic data 901 used for (or configured to be compiled to be used for) mapping and/or navigation-related services. In one embodiment, the geographic database 111 include high resolution or high definition (HD) mapping data that provide centimeter-level or better accuracy of map features. For example, the geographic database 111 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road, and to determine map data updates (e.g., learned speed limit values) to at high accuracy levels.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 111.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 111 is stored as a hierarchical or multilevel tile-based projection or structure. More specifically, in one embodiment, the geographic database 111 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

As shown, the geographic database 111 includes node data records 903, road segment or link data records 905, POI data records 907, map matching data records 909, HD mapping data records 911, and indexes 913, for example. More, fewer, or different data records can be provided. In one embodiment, additional data records (not shown) can include cartographic ("carto") data records, routing data, and maneuver data. In one embodiment, the indexes 913 may improve the speed of data retrieval operations in the geographic database 111. In one embodiment, the indexes 913 may be used to quickly locate data without having to search every row in the geographic database 111 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 907. The geographic database 111 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 111 includes map matching data records 909 which store probe point data, probe feature/attribute values, feature set data, map matching classifications, and/or related information. For example, the map matching data records 909 can store collected probe point data for map matching, and/or the ground truth probe point data collected to train a machine learning classifier of the map matching platform 103. In yet another embodiment, the probe data records 909 can store processed probe point data and/or map matching results into data buckets for matched probe points and for unmatched probe points.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 107 and other end user devices with near real-time speed without overloading the available resources of the vehicles 107 and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 111 can be maintained by the content provider 119 in association with the services platform 115 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle (e.g., vehicle 107 and/or user device 109) along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 107 or user device 109. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a path-based map matcher may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 10:
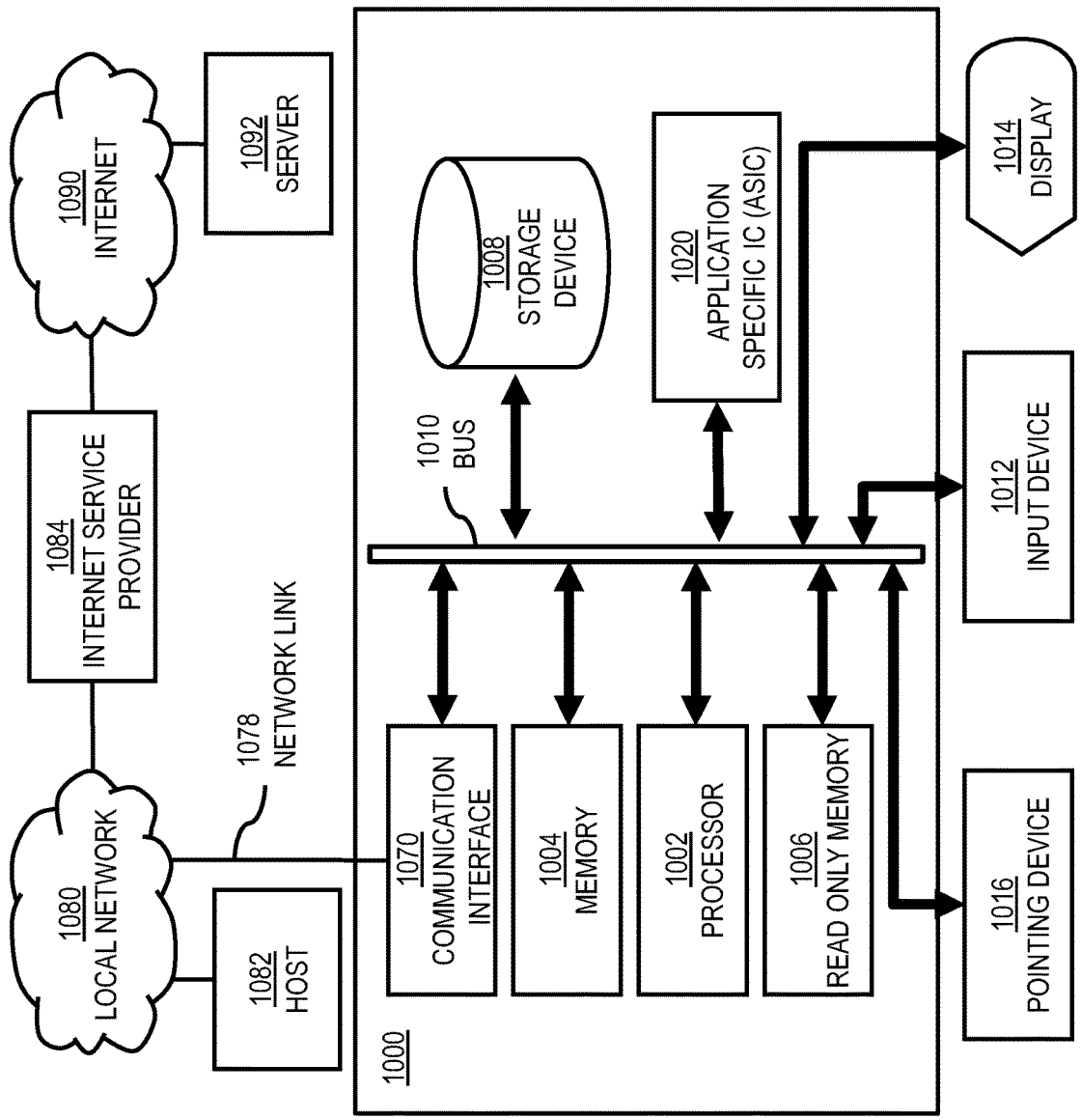
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to provide a path-based map matcher as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing a path-based map matcher. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RANI) or other dynamic storage device, stores information including processor instructions for providing a path-based map matcher. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing a path-based map matcher, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners, and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic, or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 127 for providing a path-based map matcher.

The term computer-readable medium is used herein to refer to any medium that participates in providing information to processor 1002, including instructions for execution. Such a medium may take many forms, including, but not limited to, non-volatile media, volatile media, and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092.

FIG. 11 illustrates a chip set 1100 upon which an embodiment of the invention may be implemented. Chip set 1100 is programmed to provide a path-based map matcher as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as or one or more application-specific integrated circuits (ASIC) 1107. For example, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide a path-based map matcher. The memory 1105 also stores the data associated with or generated by the execution of the inventive steps.

Figure 12:
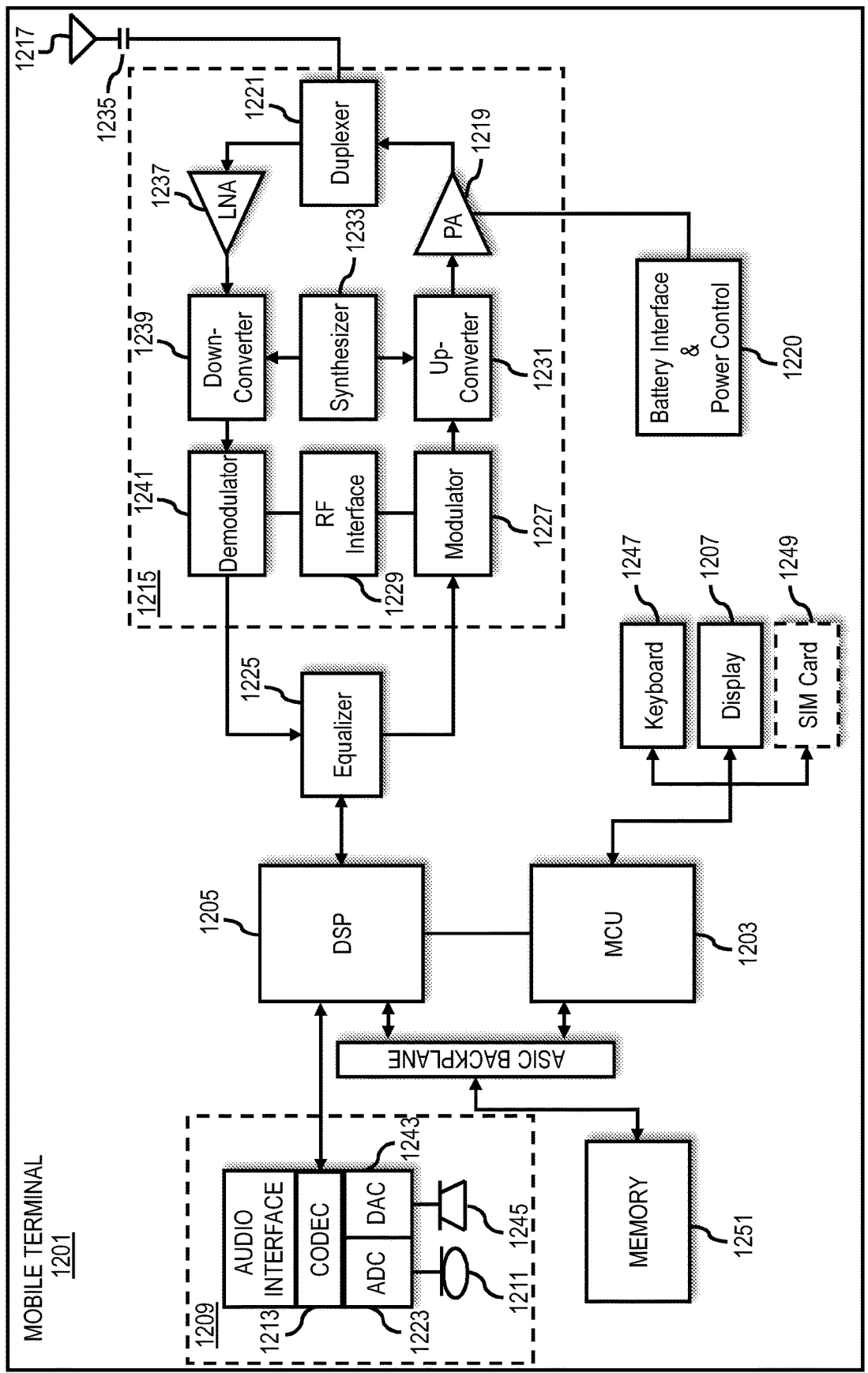
FIG. 12 is a diagram of a mobile terminal that can be used to implement an embodiment.

FIG. 12 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide a path-based map matcher. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for path-based map matching of a sequence of probe points comprising:
   projecting a probe point of the sequence of probe points to a plurality of element projections, wherein each of the plurality of element projections is a candidate projection of the probe point to a respective candidate location on a map-matched road segment;
   determining an optimal spatial boundary containing the plurality of element projections associated to the probe point;
   specifying a distance to the optimal spatial boundary from a node as a heuristic of a probabilistic map matcher for all of the plurality of element projections associated to the probe point;
   executing the probabilistic map matcher based on the heuristic to determine a map matched path; and
   providing the map matched path as an output.

2. The method of claim 1, wherein the probabilistic map matcher is based on an A* algorithm, and wherein the heuristic represents a movement cost of the A* algorithm.

3. The method of claim 1, wherein the optimal spatial boundary is a minimal circle.

4. The method of claim 3, wherein the distance is a distance to a circumference of the minimal circle.

5. The method of claim 4, wherein the distance to the circumference of the minimal circle is determined by subtracting a radius of the minimal circle from a distance to a center of the minimal circle.

6. The method of claim 1, wherein the plurality of element projections is taken as a plurality of states for a Hidden Markov Model of the probabilistic map matcher.

7. The method of claim 1, wherein the executing of the probabilistic map matcher comprises building a trellis diagram of the plurality of element projections, and wherein respective transition probabilities associated with the plurality of element projections in the trellis diagram are based on the heuristic.

8. The method of claim 7, further comprising:
   using a Viterbi algorithm to select the map matched path corresponding to a candidate path represented in the trellis diagram associated with a highest probability.

9. The method of claim 1, further comprising:
   determining the plurality of element projections based on a proximity search around the probe point using a configurable radius.

10. The method of claim 9, wherein the plurality of element projections includes a plurality of points on a road network at predetermined intervals that are within a range of the proximity search.

11. The method of claim 1, wherein the sequence of probe points is filtered to a predetermined sparsity.

12. The method of claim 11, wherein the predetermined sparsity is based on an inter-probe point distance that is a predetermined factor greater than a size of the optimal spatial boundary.

13. An apparatus comprising:
   at least one processor; and
   at least one memory including computer program code for one or more programs,
   the at least one memory and the computer program code configured to, with the at least one processor, cause the apparatus to perform at least the following,
   project a probe point of the sequence of probe points to a plurality of element projections, wherein each of the plurality of element projections is a candidate projection of the probe point to a respective candidate location on a map-matched road segment;
   determine a optimal spatial boundary containing the plurality of element projections associated to the probe point;
   specify a distance to the optimal spatial boundary from a previous node as a heuristic of a probabilistic map matcher for all of the plurality of element projections associated to the probe point;
   execute the probabilistic map matcher based on the heuristic to determine a map matched path; and
   provide the map matched path as an output.

14. The apparatus of claim 13, wherein the probabilistic map matcher is based on an A* algorithm, and wherein the heuristic represents a movement cost of the A* algorithm.

15. The apparatus of claim 13, wherein the optimal spatial boundary is a minimal circle.

16. The apparatus of claim 15, wherein the distance is a distance to a circumference of the minimal circle.

17. A non-transitory computer-readable storage medium carrying one or more sequences of one or more instructions which, when executed by one or more processors, cause an apparatus to at least perform the following steps:
   projecting a probe point of the sequence of probe points to a plurality of element projections, wherein each of the plurality of element projections is a candidate projection of the probe point to a respective candidate location on a map-matched road segment;
   determining an optimal spatial boundary containing the plurality of element projections associated to the probe point;
   specifying a distance to the optimal spatial boundary from a previous node as a heuristic of a probabilistic map matcher for all of the plurality of element projections associated to the probe point;
   executing the probabilistic map matcher based on the heuristic to determine a map matched path; and
   providing the map matched path as an output.

18. The non-transitory computer-readable storage medium of claim 17, wherein the probabilistic map matcher is based on an A* algorithm, and wherein the heuristic represents a movement cost of the A* algorithm.

19. The non-transitory computer-readable storage medium of claim 17, wherein the optimal spatial boundary is a minimal circle.

20. The non-transitory computer-readable storage medium of claim 19, wherein the distance is a distance to a circumference of the minimal circle.

* * * * *